United States Patent [19]

Cifrese et al.

[11] Patent Number: 4,466,983
[45] Date of Patent: Aug. 21, 1984

[54] SUBSTANTIALLY NON-AQUEOUS SEMI-LIQUID CENTER-FILL

[75] Inventors: Ralph Cifrese, Morristown; Mario W. Medri, Short Hills, both of N.J.; Leonard P. Abbazia, Brooklyn, N.Y.

[73] Assignee: Warner-Lambert Company, Morris Plains, N.J.

[21] Appl. No.: 463,755

[22] Filed: Feb. 4, 1983

[51] Int. Cl.$^3$ .......................... A23G 3/30; A23G 3/00
[52] U.S. Cl. ........................................ 426/5; 426/103; 426/282; 426/804; 426/660; 424/48
[58] Field of Search ......................................... 426/3–6, 426/103, 282, 804, 660, 661; 424/48

[56] References Cited

U.S. PATENT DOCUMENTS

| | | | |
|---|---|---|---|
| 3,894,154 | 7/1975 | Graff | 426/282 |
| 4,156,740 | 5/1979 | Glass | 426/103 |
| 4,250,196 | 2/1981 | Friello | 426/804 |
| 4,252,829 | 2/1981 | Terrevazzi | 426/3 |
| 4,316,915 | 2/1982 | Friello | 426/103 |

Primary Examiner—Jeanette M. Hunter
Attorney, Agent, or Firm—Daniel A. Scola, Jr.; Gary M. Nath

[57] ABSTRACT

A center-filled confectionery or chewing gum composition having an outer shell enclosing a cavity, and a sugarless, substantially non-aqueous semi-liquid center-fill within said cavity, said liquid center-fill comprising.
  (a) about 30 to about 50% hydrogenated starch hydrolysate;
  (b) about 30 to about 50% sorbitol solution;
  (c) about 20 to 50% glycerin;
  (d) optionally a flavor in a sufficient amount to impart its taste;

Wherein the total water content of the center-fill is about 5% or less, all percents being based on the weight of semi-liquid center-fill.

A method of making the center-fill is also disclosed.

13 Claims, No Drawings

SUBSTANTIALLY NON-AQUEOUS SEMI-LIQUID CENTER-FILL

The present invention relates to a sugarless center-fill for use in a chewing gum, confectionery or medicament wherein a semi-liquid center-fill is substantially free from moisture and comprises a hydrogenated starch hydrolysate content of about 30 to about 50% by weight of the liquid center-fill.

Center-filled chewing gums and confectioneries are well known in the art. U.S. Pat. No. 4,250,196 to Friello, discloses a liquid center-fill which is an aqueous solution consisting essentially of hydrogenated starch hydrolysate present in the solution as a solid in the amount of about 75 to about 93% by weight of the liquid fill. The inclusion of the hydrogenated starch hydrolysate teaches its utility as a retardant for viscosity increases of the aqueous solution. The hydrogenated starch hydrolysate is disclosed both as a humectant and a sweetener.

U.S. Pat. No. 3,894,154 teaches the use of glycerin in the liquid fill of a center-fill chewing gum as a material to retard to increases in the viscosity of a liquid center-filled portion.

U.S. Pat. No. 4,292,329 discloses a method of improving the flavor-retaining capacity of a center-filled chewing gum by incorporating an emulsifier which functions both as an emulsifier and retention agent to prevent the flavor from penetrating into the gum base. The liquid fills generally contain from 5 to 10% of water. U.S. Pat. No. 4,157,402 also teaches the use of an emulsifier for similar purposes but requires the emulsifier to have a particular hydrophile-lipophile (HLB) range.

U.S. Pat. No. 4,252,829 discloses a liquid fill for center-filled chewing gum consisting essentially of an aqueous solution containing dissolved solid portions, 8 to 13% sorbitol and 2 to 5% of a propylene glycol-flavor solution.

U.S. Pat. No. 4,156,740 teaches the employment of a natural gum, glycerin as a humectant and an additional water miscible humectant as pre-mix additives to both a sugarless gum formulation and the center-filled composition prior to actual formulation of the center-filled-gum.

Canadian Pat. No. 899,143 discloses sugarless foods including confections such as candies and chewing gums containing hydrogenated starch hydrolysate.

U.S. Pat. No. 4,316,915 discloses a center-filled chewing gum having a liquid fill consisting essentially of from about 94 to 99.5% glycerin and about 0.5 to about 6% by weight of a thickener, the water content of the center-fill being no more than about 2% or less. Minor amounts of hydrogenated starch hydrolysate in combination with sorbitol or other sugar alcohols are also disclosed.

The prior art center-filled compositions have all sought to overcome the problem of retaining the fluidity of the liquid center. Since the liquid centers have conventionally been at least to some extent aqueous in nature, the focus has traditionally been toward finding a means of preventing moisture from penetrating into the outer shell encapsulating the liquid center, which if left unchecked would result in crystallization or solidification of the liquid center, and subsequent loss of flavor into the shell wall. In confectionery items, water absorption into the shell wall can result in dissolution of the candy product, making it sticky and unacceptable for commercial use.

It is apparent that there is indeed a need for a center-filled confectionery, chewing gum composition or medicament which overcomes the disadvantages associated with center-fills which rely on water for their liquidity.

A semi-liquid center-filled composition has been unexpectedly discovered which comprises a center-filled confectionery, chewing gum or medicament composition having an outer shell enclosing a cavity, and a sugarless, substantially non-aqueous semi-liquid center-fill within said cavity, said semi-liquid center comprising:

(a) about 30 to about 50% hydrogenated starch hydrolysate;
(b) about 30 to about 50% sorbitol solution;
(c) about 20 to about 40% glycerin;
(d) optionally a flavor in a sufficient amount to impart its taste;

wherein the total water content of the semi-liquid center-fill is about 5% or less all percents being based on the weight of the semi-liquid center-fill.

The semi-liquid center-fills of the instant chewing gums, confectionery and medicament compositions rely on the critical proportions and amounts of hydrogenated starch hydrolysate, sorbitol and glycerine. Hydrogenated starch hydrolysate, is commonly known under a variety of trademarks, e.g., "LYCASIN," manufactured by Roquetter Freres, Lisle, France, and is believed to function as both a humectant and a sweetener. It is particularly effective in retarding the formation of crystal growth at the interface of the center-fill and the enclosing outer shell.

When the required components are present in the above ranges, a center-filled composition is made which is surprisingly stable and overcomes the problem of crystallization and loss of flavor so common to the prior art compositions.

The instant center-fill compositions are semi-liquid in nature. The term "semi-liquid" means that the viscosity of the center-fill can range from a gel-like consistency or pasty quality, to a relatively thixotropic, sticky liquid quality. In no event, however, should there be present moisture greater than about 5% by weight of the center-fill. The viscosity of the center-fill is to remain relatively stable, that is, remain in the semi-liquid form without solidifying or crystallizing for long periods of time. Typically the center-fill should have a shelf-life, when placed in a chewing gum, confectionery or medicament vehicle, of at least a minimum of 6 months, but preferably a year or longer.

The instant semi-liquids differ considerably from those of the prior art in that the instant ones are substantially non-aqueous, containing not more than 5% by weight of moisture. Water may be present as residual impurities in the starting materials or through unintentional absorption through the atmosphere. The process of making the semi-liquid center fill, described in detail hereinafter, employs cooking temperatures substantially greater than 100° C. primarily to be sure that as much bound and free water is driven off as possible. Certain formulations call for the addition of ingredients which require nominal amounts of water to aid in solubilizing them into the mixture of hydrogenated starch hydrolysate, sorbitol and glycerine. This water is evaporated, however, by subsequent heating at temperatures well above the boiling point of water, leaving the final moisture content at the required level of 5% or less.

The present invention also relates to a method of making a semi-liquid sugarless, substantially non-aqueous center-fill for use in chewing gums, confectioneries and medicaments said method comprising heating a mixture of hydrogenated starch hydrolysate, sorbitol and glycerine to a temperature above about 150° C. for a time sufficient enough to substantially drive-off both free and bound water, leaving a total water content of about 5% or less and cooling the hot mixture, at which time flavoring and other constituents if desired, are added. If the vehicle is a hard confectionery, the cooling temperature prior to the addition of flavors should be about 75° C. If the vehicle is a chewing gum or a confectionery of the chewy nougat-type, the cooling temperature should be less than 75° C. such that the chewing gum or nougat piece as a whole does not melt or soften undesireably when the center-fil is added to it. The mixture is mixed or agitated to uniformly blend or disperse the flavor, at which time fats, emulsifiers and other optional ingredients well known to the art may be added in quantities and proportions which are routinely determined by those skilled in the art. Subsequent to the addition of all the desired ingredients, the mixture is cooled until a semi-liquid material is obtained and then transferred to suitable dispensing and processing equipment for inclusion in a chewing gum, confectionery or medicament vehicle. Generally, the mixture should be cooled to about 66° C. to produce the semi-liquid center-fill.

The initial heating of required ingredients need not be done in admixture, but could be heated individually and admixed after reaching temperature. It is preferred, however, that the hydrogenated starch hydrolysate, sorbitol and glycerine ingredients be heated in admixture to a temperature above about 150° C., more preferably to a temperature of about 168.5° C. for a time sufficient to evaporate and drive off moisture to the requisite level. It is preferred that a vacuum is pulled on the mixture after it is initially heated, to assure that the water content is no greater than about 5%, and preferably less than about 5%.

It has been discovered that the semi-liquid center-fills of the applicant's invention must contain the percentages of hydrogenated starch hydrolysate, sorbitol and glycerine stated herein, or the resultant material will be unacceptable for intended purposes upon cooling. Hydrogenated starch hydrolysate, when cooked by itself to temperatures high enough to drive-off water, and subsequently cooled, solidifies. Sorbitol, when cooked alone and subsequently cooled exhibits similar results, and additionally may exhibit browning at certain high temperatures. These results would produce acceptable semi-liquid center-fills. When the mixture of the instant composition is cooled, however, the soft, semi-liquid, substantially non-aqueous center-fills of the applicant's invention are obtained.

It is preferred that the hydrogenated starch hydrolysate be present in the center-fill in the amount of about 30% to about 50% by weight of the center-fill; more preferably in the amount of about 30% to about 40%; and most preferably in the amount of about 33.3%, by weight of the center-fill. When the hydrogenated starch hydrolysate is present in amounts outside of these ranges, the resulting center-fill either does not exhibit the proper characteristics required of the instant center-fills. For example, when less than about 30% hydrogenated starch hydrolysate is present, the resulting center-fill will solidify and crystallize either immediately upon cooling or in a matter of days at room temperature.

This criticality also applies to the sorbitol solution and the glycerin as well. The sorbitol solution if present in amounts outside the ranges given for the invention produces similar results. If amounts of glycerin greater than about 40% by weight of the center-fill are present, an oily taste results.

The semi-liquid center-fill may contain a variety of other ingredients, which are well known in the art, to enhance its color and flavor or to provide stability, prevent oxidation, or other desired functions.

In accordance with the present invention, the liquid center-filled composition described herein can be used as fillings for chewing gums, confectioneries and medicaments.

With regard to chewing gum formulations in particular, the gum base used in this invention may be any gum base well known in the art. Illustrative examples of suitable polymers in gum bases include without limitation substances of vegetable origin such as chicle, jelutong, guttapercha and crown gum; synthetic elastomers such as butadiene-styrene copolymer, isobutylene isoprene copolymer, polyethylene, polyisobutylene and polyvinylacetate, mixtures thereof, and the like.

The amount of gum base employed will vary greatly depending on various factors such as the type of base used, consistency desired and other components used to make the final product. In general, amounts from about 5% to 45% by weight of the final gum base composition are acceptable with preferred amounts of about 15% to about 25% by weight being usable.

Plasticizers or softeners such as lanolin, stearic acid, sodium stearate, potassium stearate, glyceryl triacetate, glycerin and the like may also be incorporated into the gum base to obtain desirable texture and consistency properties. Such materials are generally employed in amounts up to 30% by weight and preferably from 3 to 7% by weight of the final gum base composition.

The chewing gum composition generally contains a sweetening agent. Sweetening agents may be selected from a wide range of materials such as water-soluble sweetening agents, water-soluble artificial sweeteners, and dipeptide based sweetners, including mixtures thereof. Without being limited to particular sweetners, representative illustrations encompass:

A. Water soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweetners such as the soluble saccharin salts, i.e. sodium or calcium saccharin salts, cyclamate salts, acesulfam-K and the like, and the free acid form of saccharin.

C. Dipeptide based sweeteners such as L-aspartyl L-phenylalanine methyl ester and materials described in U.S. Pat. No. 3,492,131 and the like.

In general, the amount of sweetener will vary with the desired amount of sweetner selected for a particular chewing gum. The amount will normally be about 0.01% to about 90% by weight when using an easily extractable sweetner. The water-soluble sweetners described in category A are preferably used in amounts of about 25% to about 75% by weight, and most preferably about 50% to about 65% by weight of the final chewing gum composition. In contrast, the artificial sweetners described in categories B and C are used in amounts of about 0.005% to about 5.0% and most preferably about 0.05% to about 2.5% by weight of the final chewing gum composition. These amounts are necessary to achieve a desired level of sweetness independent from the flavor level achieved from the flavor oil.

The chewing gum of this invention may likewise contain additional conventional additives, including fillers and mineral adjuvants such as calcium carbonate, magnesium carbonate and talc; emulsifiers such as glyceryl monostearate and lecithin; coloring agents such as titanium dioxide and other conventional chewing gum additives known to one skilled in the chewing gum art.

As previously disclosed, another embodiment of the instant invention concerns the use of the semi-liquid center-fills in a confectioary vehicle.

The preparation of confectionery formulations is historically well known and has changed little through the years. In this regard, confectionery items have been classified as either the "hard" type or the "soft" type.

The preparation of soft confections, such as nougat, involves conventional methods, such as the combination of two primary components, namely (1) a high boiling syrup such as corn syrup or the like and (2) a relatively light textured frappe, generally prepared from gelatin, egg albumen, milk proteins such as casein and vegetable proteins such as soy protein, and the like. The frappe is generally relatively light, and may, for example, range in density from about 0.5 to about 0.7.

The high boiled syrup of the soft confectionery is relatively viscous and possesses a higher density, and frequently contains a substantial amount of sugar. Conventionally, the final nougat composition is prepared by the addition of the high boiled syrup to the frappe under agitation, to form the basic nougat mixture. Further ingredients such as flavoring, additional sugar colorants, preservatives, medicaments, mixtures thereof and the like may be added thereafter also under agitation. A general discussion of the composition and preparation of nougat confections may be found in B. W. Minifie, *CHOCOLATE, COCOA AND CONFECTIONERY*: Science and Technology, 2nd Edition, AVI Publishing Co., Inc., Westport, Conn. (1980), at pages 424–425.

The procedure for preparing the "soft" confectionery involves known procedures. In general, the frappe component is prepared first and thereafter the syrup component is slowly added under agitation at a temperature of at least 65° C. and preferably at least 100° C. The components are continued to be mixed to form a uniform mixture, after which the mixture is cooled to a temperature below 80° C. at which point the flavor may be added. The mixture is further mixed for an additional period at which point it is ready for removal and formed into suitable confectionary shapes.

Similar to the soft confectionery, hard confectionery may be utilized in this invention which likewise may be processed and formulated by conventional means. In general, a hard confectionery has a base composed of a mixture of cane or beet sugar and glucose syrup, low moisture levels from 0.5 to 1.5% and is present in the final confectionery in amounts of between about 5% and about 99% by weight of the final composition. Such confectionery may be routinely prepared by conventional methods, such as those involving fire cookers, vacuum cookers and scraped-surface cookers also referred to as high speed atmospheric cookers.

Fire cookers involve the traditional method of making candy base. In this method the desired quantity of sugar is dissolved in water by heating in a kettle until the sugar dissolves. Corn syrup or an invert sugar is then added and cooking continued until a final temperature of 145° to 156° C. is achieved. The batch is then cooled and worked as a plastic-like mass to incorporate additives.

A high-speed atmospheric cooker uses a heat-exchanger surface which involves spreading a film of candy on a heat exchange surface, the candy is heated to 165° to 170° C. in a few minutes. The candy is then rapidly cooked to 100° to 120° C. and worked as a plastic-like mass enabling incorporation or the additives, such as flavor, color, acidulents and medicaments.

In vacuum cookers, the sugar and corn syrup are boiled to 125° to 132° C. and vacuum applied and additional water is boiled off without extra heating. When cooking is complete, the mass is a semi-solid, having a plastic-like consistency. At this point color, flavors and other additives are mixed in the mass by routine mechanical mixing operations.

The optimum mixing required to uniformly mix the flavor, color and other additives during conventional manufacturing of hard confectionery is determined by the time needed to obtain a uniform distribution of the materials. Normally, mixing times of 4 to 10 minutes have been found acceptable.

Once the candy mass has been properly tempered it may be cut into workable portions or formed into desired shapes. A general discussion of the composition and preparation of hard confections may be found in H. A. Lieberman, *Pharmaceutical Dosage Forms: Tablets* Vol 1 (1980), Marcel Dekker, Inc. at pages 339 to 469.

It should be mentioned that the apparatus useful in accordance with the present invention comprises those cooking and mixing apparatus well known in the confectionery manufacturing arts, and therefore the selection of specific apparatus will be apparent to the artisan.

The confectionery useful in this invention includes, but is not limited to, sugarless boiled candy, pressed tablets, toffee and nougat.

Flavors which may optionally be added to the liquid center-fill composition are those well known in the gum and confectionery art. For example, synthetic flavor oils, and/or oils derived from plants, leaves, flowers, fruits and so forth, and combinations thereof are useful. Representative flavor oils include spearmint oil, peppermint oil, cinnamon oil, and oil of wintergreen (methylsalicylate). Also useful are artificial, natural or synthetic fruit flavors such as citrus oils including lemon, orange, grape, lime, and grapefruit, and fruit essences including apple, strawberry, cherry, pineapple and so forth.

The amount of flavoring agent employed is normally a matter of preference subject to such factors as flavor type, base type and strength desired. In general, amounts of about 0.05% to about 5.0% by weight of the final composition are useable with amount of about 0.3% to about 1.5% being preferred and about 0.8% to about 1.2% being most preferred.

The following examples are given to illustrate the invention, but are not to be limiting thereof. All percentages given throughout the specification are based upon weight unless otherwise indicated.

EXAMPLE 1

A series of substantially non-aqueous center-fill formulations containing hydrogenated starch hydrolysate, sorbitol and glycerine were prepared according to the method described above. Table one indicates eighteen (18) formulations which were prepared and observed for their ability to remain in a stable, semi-liquid state at ambient conditions for a period of time. The center-fills were left in candy tray molds and their ability to remain in the semi-liquid state was monitored. Those that crystallized and solidified either immediately upon cooling, or within a short time thereafter, e.g., about 1 to about 6 months, were deemed to be commercially unacceptable.

As evident from Table I, those formulations which did not contain all three ingredients in the essential ranges of this invention did not produce acceptable center-fills. The exception to this is a 50/50 mix of sorbitol and glycerine. This mixture produced an acceptable semi-liquid upon cooling but suffered from an oily taste and a shorter semi-liquid life than preferred.

Formulations 13-15 are examples of the instant invention, with the preferred embodiment being formulation 14. It is most preferred, therefore, that a chewing gum, candy or other vehicle be made using this formulation as a center-fill.

As seen from Table I, formulations which were not in the ranges of the invention did not produce commercially acceptable semi-liquid center-fills. Formulations 1, 2 and 3 each solidified immediately upon cooling and are therefore not capable of producing a stable semi-liquid center-fill. Formulation 4 retained a slight flexibility upon cooling, but was also a solid. As mentioned above, Formulation 5, containing a 50/50 mixture of sorbitol solution and hydrogenated starch hydrolysate, produced a semi-liquid mixture upon cooling, but suffered from an oily taste and shorter shelf-life than those center-fills containing all three constituents in the amounts preferred.

Formulations 8 and 9 each crystallized to a solid after standing at room temperature for two weeks. Formulation 10 crystallized to a solid after 1 month at room temperature and Formulations 11 and 12 crystallized to a solid upon standing at room temperature for 1 month and 4 months, respectively. These results were unacceptable for center-fill products of the instant invention.

Formulation 13 remained stable in the semi-liquid state for six months and possessed excellent taste. It is representative of one of the preferred formulations of the subject invention. Formulation 14 remained stable in the semi-liquid state for more than one (1) year and also had excellent taste. Formulation 14 is the most preferred formulation of the subject invention, containing 33.3% of sorbitol solution, 33.3% of hydrogenated starch hydrolysate and 33.3% of glycerin.

Formulations 15-18 remained in the semi-liquid state upon cooling but had an unacceptable oily taste due to the high amounts of glycerin.

EXAMPLE 2

This example demonstrates the usefulness of the instant center-fills in a sugarless hard candy. The formulations below were prepared as described above, and used to fill hard candy having the following composition: 75 lbs. hydrogenated starch hydrolysate; 708.2 grams of sorbitol solution; 708.2 grams of mannitol; 24.5 grams of cherry flavor and a small quantity of citric acid. The candy was stored at room temperature for 18 months. Slight solidification occurred after 14 months, but the center-fill was still predominantly in semi-liquid form after 18 months. The flavors in Formulation I and II were peppermint oil and cherry respectively.

| Ingredient | Formulation - % by weight | |
|---|---|---|
| | I | II |
| Lycasin | 35.60 | 32.99 |
| Sorbitol solution | 35.60 | 32.99 |
| Glycerin | 28.48 | 32.99 |
| Flavor | 00.09 | 00.08 |
| Durkee 500 (liquid fat) | 00.22 | — |
| Liquid Lecithin (emulsifier) | 00.01 | — |
| Citric Acid | — | 00.30 |
| Water | — | 00.58 |
| Color | — | 00.07 |

The invention being thus described, it will be obvious that the same may be varied in many ways. Such variations are not to be regarded as a departure from the spirit and scope of the invention and all such modifications are intended to be included within the scope of the following claims.

We claim:

1. A center-filled, chewing gum composition having an outer shell enclosing a cavity, and a sugarless, semi-liquid center-fill within said cavity, said semi-liquid center-fill comprising:
   (a) about 30 to about 50% hydrogenated starch hydrolysate;
   (b) about 30 to 50% sorbitol solution;
   (c) about 20 to about 40% glycerin;
   (d) optionally a flavor in a sufficient amount to impart its taste;
wherein the total water content of the semi-liquid center-fill is less than about 5%, the percents being based on the weight of the semi-liquid center-fill.

2. The sugarless center-filled composition of claim 1 wherein the said semi-liquid center-fill has a hydrogenated starch hydrolysate content of about 30.0 to about 40%, a sorbitol solution content of about 30.0 to about 40%, and a glycerin content of about 30.0% to about 40%, by weight of the semi-liquid center-fill.

3. A center-filled composition of claim 1 wherein the center-fill has a hydrogenated starch hydrolysate content of 33.3%, a sorbitol solution of about 33.3% and a glycerin content of about 33.3%, by weight of the center-fill.

4. The composition of claim 1 wherein the flavor is selected from the group consisting of peppermint oil, cinnamon oil, oil of wintergreen (methylsalicylate),

TABLE I

| Formulation | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Sorbitol Sol. | 90 | 80 | 70 | 60 | 50 | 90 | 80 | 60 | 60 | 50 | 50 | 45 | 40 | 33.3 | 30 | 10 | 20 | 20 |
| Hydrogenated starch hydrolysate | 10 | 20 | 30 | 40 | 50 | — | — | 10 | 20 | 35 | 30 | 35 | 40 | 33.3 | 30 | 50 | 40 | 35 |
| Glycerin | — | — | — | — | — | 10 | 20 | 30 | 20 | 15 | 20 | 20 | 20 | 33.3 | 40 | 40 | 40 | 45 |

All values are based on 100% of the mixture prior to cooking
Sorbitol solution is commercially available from a number of manufacturers e.g., Pfizer Corporation, and contains 70% sobritol solids in aqueous solution.

lemon oil, orange oil, grape oil, lime oil, grapefruit oil, apple essence, strawberry essence, cherry essence and pineapple essence.

5. The composition of claim 1 wherein further comprising an artificial sweetener.

6. A semi-liquid center-fill composition for use in chewing gums, confectioneries and medicaments, comprising:
   (a) about 30 to about 50% hydrogenated starch hydrolysate;
   (b) about 30 to about 50% sorbitol solution;
   (c) about 20 to about 40% glycerin;
   (d) optionally a flavor in a sufficient amount to impart its taste;
wherein the total water content of the semi-liquid center-fill is about 5% or less, all percents being based on the weight of semi-liquid center-fill.

7. The semi-liquid center-fill composition of claim 6 wherein the amount of hydrogenated starch hydrolysate, sorbitol solution and glycerin are each present in the amount of 33.3% by weight of the semi-liquid center-fill.

8. The semi-liquid center-fill composition of claim 6 wherein the flavor is selected from the group consisting of peppermint oil, spearmint oil, cinnamon oil, oil of wintergreen (methylsalicylate), lemon oil, orange oil, grape oil, lime oil, grapefruit oil, apple essence, strawberry essence, cherry essence and pineapple essence.

9. A method of making a sugarless semi-liquid, substantially non-aqueous center-fill, useful in vehicles such as chewing gums, confectioneries and medicaments, comprising,
   (a) heating a mixture of hydrogenated starch hydrolysate, sorbitol and glycerin to a temperature above 150° C. for a time sufficient to substantially drive off bound and free water to a level of about 5% or less by weight of the center-fill;
   (b) cooling the hot mixture to about 75° C. or less at which time flavoring may optionally be added;
   (c) further cooling the mixture to a temperature at which a semi-liquid center-fill remains.

10. A method of making a chewing gum having a sugarless, substantially non-aqueous semi-liquid center-fill comprising,
    filling a chewing gum cavity with a semi-liquid center-fill comprising,
    (a) about 30 to about 50% hydrogenated starch hydrolysate;
    (b) about 30 to about 50% sorbitol solution;
    (c) about 20 to about 40% glycerin;
    (d) optionally a flavor in a sufficient amount to impart its taste;
wherein the water content of a center-fill is 5% or less, all percents by weight of the center-fill.

11. A center-filled confectionery composition having an outer shell enclosing a cavity, and a sugarless, semi-liquid center-fill within said cavity, said semi-liquid center-fill comprising,
    (a) about 30 to about 50% hydrogenated starch hydrolysate;
    (b) about 30 to 50% sorbitol solution;
    (c) about 20 to about 40% glycerin;
    (d) optionally a flavor in a sufficient amount to impart its taste;
wherein the total water content of the semi-liquid center-fill is less than about 5%, the percents being based on the weight of the semi-liquid center-fill.

12. The center-filled composition of claim 11 wherein the flavor is selected from the group consisting of peppermint oil, spearmint oil, cinnamon oil, oil of wintergreen (methylsalicylate), lemon oil, orange oil, grape oil, lime oil, grapefruit oil, apple essence, strawberry essence, cherry essence and pineapple essence.

13. A method of making a confectionery composition having a sugarless, substantially non-aqueous semi-liquid center-fill comprising, filling the confectionery with a semi-liquid center-fill comprising,
    (a) about 30 to about 50% hydrogenated starch hydrolysate;
    (b) about 30 to 50% sorbitol solution;
    (c) about 20 to about 40% glycerin;
    (d) optionally a flavor in a sufficient amount to impart its taste;
wherein the total water content of the semi-liquid center-fill is less than about 5%, the percents being based on the weight of the semi-liquid center-fill.

* * * * *